United States Patent [19]

Kozawa et al.

[11] Patent Number: 4,787,262
[45] Date of Patent: Nov. 29, 1988

[54] WRIST DEVICE OF ROBOT

[75] Inventors: Fusaaki Kozawa, Ibaraki; Shigemi Igarashi, Ushiku; Koh Tsuji, Ebina; Tatenori Jinriki, Funabashi, all of Japan

[73] Assignee: Hitachi, Ltd., Tokyo, Japan

[21] Appl. No.: 60,349

[22] Filed: Jun. 10, 1987

[30] Foreign Application Priority Data

Jun. 13, 1986 [JP] Japan ................................ 61-135968

[51] Int. Cl.4 ....................... B25J 17/02; G05G 11/00
[52] U.S. Cl. ......................................... 74/479; 74/640;
74/665 C; 901/23; 901/26; 901/29
[58] Field of Search ................ 74/479, 665 C, 665 B,
74/640; 901/23, 25, 26, 29

[56] References Cited

U.S. PATENT DOCUMENTS

| 3,784,031 | 1/1974 | Niitu et al. ........................ 901/26 X |
| 4,068,536 | 1/1978 | Stackhouse ....................... 901/29 X |
| 4,548,097 | 10/1985 | Zimmer ............................ 74/665 M |
| 4,574,655 | 3/1986 | Kimura et al. ....................... 74/640 |
| 4,637,774 | 1/1987 | Hakamura et al. ............... 901/29 X |
| 4,642,021 | 2/1987 | Kikuchi ............................ 901/29 X |
| 4,671,732 | 6/1987 | Gorman ............................ 901/29 X |
| 4,688,984 | 8/1987 | Nakashima et al. .............. 901/29 X |

Primary Examiner—Allan D. Herrmann
Attorney, Agent, or Firm—Antonelli, Terry & Wands

[57] ABSTRACT

The present invention relates to the wrist device of a robot which has a speed reducers built in a wrist portion and which attains three degrees of rotating freedom orthogonal to one another, and is characterized in that three transmission shafts penetrating through the interior of an arm are arranged in parallel with one another as power transmission means within the arm.

5 Claims, 4 Drawing Sheets

WRIST DEVICE OF ROBOT

BACKGROUND OF THE INVENTION

The present invention relates to the wrist device of a robot, and more particularly to a wrist device which has the wrist portion with built-in speed reducers to afford three degrees of rotating freedom orthogonal to one another.

Reducing the size and weight of a wrist portion, reducing the diameter of an arm, and raising the speed and precision of a motion have been required of industrial robots in recent years in order to do jobs such as welding, applying a sealant or assembling components, where an appliance as well as the wrist portion for holding it, and a part of the arm for supporting the wrist portion are inserted into, for example, the car body of an automobile. It is also necessary that the attitude of the appliance can be selected at will at the place of insertion, such that three degrees of rotating freedom are usually required of a wrist device. The wrist device of an industrial robot fulfilling these requirements is disclosed in U.S. Pat. No. 4,548,097 by way of example.

The wrist device of the industrial robot of this type includes a wrist portion which has three degrees of rotating freedom extending orthogonally to one another and intersecting at a single point. Speed reducers having high reduction ratios are assembled in the wrist portion. The rotative power of driving motors mounted on the rear end of an arm is lowered immediately before a driven member through transmission shafts of triple structure penetrating the interior of the arm, gears disposed within the wrist portion, etc., so as to drive and turn the driven member. The wrist device has special features, such that the occupation volume of the wrist portion within a job domain is small owing to the setup of the degrees of freedom stated above. Moreover, since the speed reducers are arranged at the final stage of a power transmission system, the degradation of a positioning accuracy and the interference of operations among the degrees of freedom attributed to the backlashes of the gears, etc. can be suppressed to the utmost, and the power transmission system from the driving motors to the input shafts of the speed reducers can be made small in size and light in weight.

In this wrist device, construction the power is transmitted to the wrist portion by the triple coaxial differential mechanism of great axial length penetrating through the arm. In the case of putting the shafts into the triple structure, the minimum inside diameter of the shaft which is arranged at the outer periphery of any of the shafts is determined by the outside diameter of the shaft to pass therein or the dimensions of bearings for rotatingly supporting the shafts at the ends of both these shafts. For this reason, especially the bores of the intermediate and outermost transmission shafts become larger than are necessary. Consequently, the weight increases and is augmented by the inertia of shafting. Such unnecessarily large bores apply also to one set of bevel gears which are mounted on the end of the intermediate shaft in the wrist portion so as to perform a directional change. Moreover, in this wrist device, the innermost shaft and the intermediate shaft transmit the power to the speed reducers built in the wrist portion, and they rotate fast at a speed near the output revolutions of the driving motors. Particularly in the driving motor for driving the intermediate transmission shaft, an unnecessarily large amount of power is unfavorably consumed for rotating the transmission elements at high speed. In addition, precise shaft machining is required and also the assemblage and maintenance become complicated for the reasons that the shafts are long and are supported through the bearings at both the ends, they are rotated at high speed and they have the triple structure. Besides, the arm needs to be lengthened more in a robot which coats, for example, the inner part of the car body of a large-sized automobile with a sealant. In this case, the disadvantages mentioned above become more conspicuous, and especially the shafts rotating at high speed might cause bending distortions due to their own weights and thereby induce excessive vibrations. It is therefore subject to a limitation that the arm is lengthened with its outside diameter held constant.

SUMMARY OF THE INVENTION

The present invention has been made recognition of the foregoing facts, and has for its object the provision of a robot wrist device which is well suited for the efficient operations of driving motors, the facilitation of machining, assemblage and maintenance, and the prolongation of an arm.

The object of the present invention is accomplished in such a way that three transmission shafts penetrating through an arm are arranged in parallel with one another as power transmission means inside the arm. A plurality of flanges are disposed around the outer periphery of the first transmission shaft being the main transmission shaft, while the second transmission shaft and the third transmission shaft are divided and journaled in bearings between the flanges and are further connected and formed by shaft couplings. Driving motors are mounted on a motor holding frame protruding from the rear end of the arm, while a coaxial driving mechanism of short axial dimension is arranged within the motor holding frame.

DESCRIPTION OF THE ILLUSTRATED EMBODIMENTS

Figure 3:
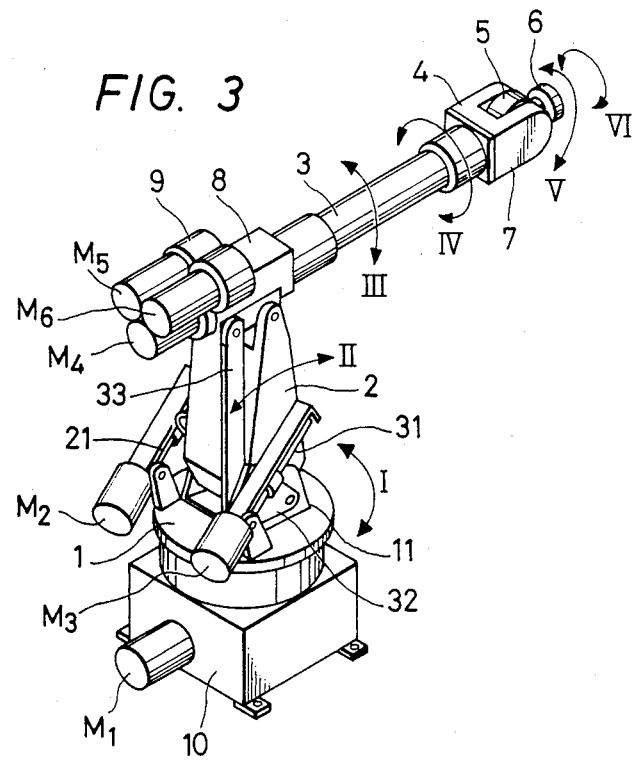
FIG. 3 is a perspective view showing the outward structure of an articulated robot as an example of an industrial robot which is equipped with the wrist device of the present invention.

FIG. 3 is a perspective view showing the general construction of a muti-articulated industrial robot to which an embodiment of a wrist device according to the present invention is applied. Referring to the figure, the industrial robot has a swivel body 1 mounted on a base 10 so as to be turnable in both directions indicated by an arrow I. The swivel body 1 is so constructed as to be driven and turned by a driving motor $M_1$ mounted on the base 10 and through power transmission means as well as speed reduction means disposed inside the base 10. An upper arm 2 is mounted on the upper plate 11 of the swivel body 1 so as to be rockable in both directions indicated by an arrow II, and it is driven and rocked through a rocking mechanism portion 21 by a driving motor $M_2$ mounted on the swivel body 1. A forearm 3 is attached to the upper end of the upper arm 2 so as to be capable of rising and falling in both directions indicated by an arrow III. The forearm 3 operates to rise or fall in such a way that power is transmitted thereto through a rocking mechanism portion 31, a lever 32 and a link 33 by a motor $M_3$ mounted on the swivel body 1. In addition, a wrist portion 7 is attached to the front extension of the forearm 3. The wrist portion 7 includes a heel-of-hand casing 4, a palm casing 5 carried by the heel-of-hand casing 4, and a finger casing 6 carried by the palm casing 5. The heel-of-hand casing 4 is turnable in both directions indicated by an arrow IV relative to the forearm 3, the palm casing 5 is rockable in both directions indicated by an arrow V relative to the heel-of-hand casing 4, and the finger casing 6 is rotatable in both directions indicated by an arrow VI relative to the palm casing 5. Besides, a wrist power portion 8 is disposed at an extension near the rear part of the forearm, and driving motors $M_4$, $M_5$ and $M_6$ for driving the aforementioned heel-of-hand casing 4, palm casing 5 and finger casing 6, respectively, are mounted on the wrist power portion through a motor holding frame 9. Further, the motor holding frame 9, forearm 3 and wrist portion 7 are furnished therein with a coaxial differential device and transmission elements such as gears and shafts to be described in detail later, through which the heel-of-hand casing 4, palm casing 5 and finger casing 6 operate to rotate or rock in the directions of the corresponding arrows stated before.

Although the embodiment shown in FIG. 3 has exemplified the multi-articulated type industrial robot, the wrist device of the present invention to be detailed now is also applicable to an industrial robot which takes another structural aspect, such as a rectangular coordinate type robot.

Figure 1:
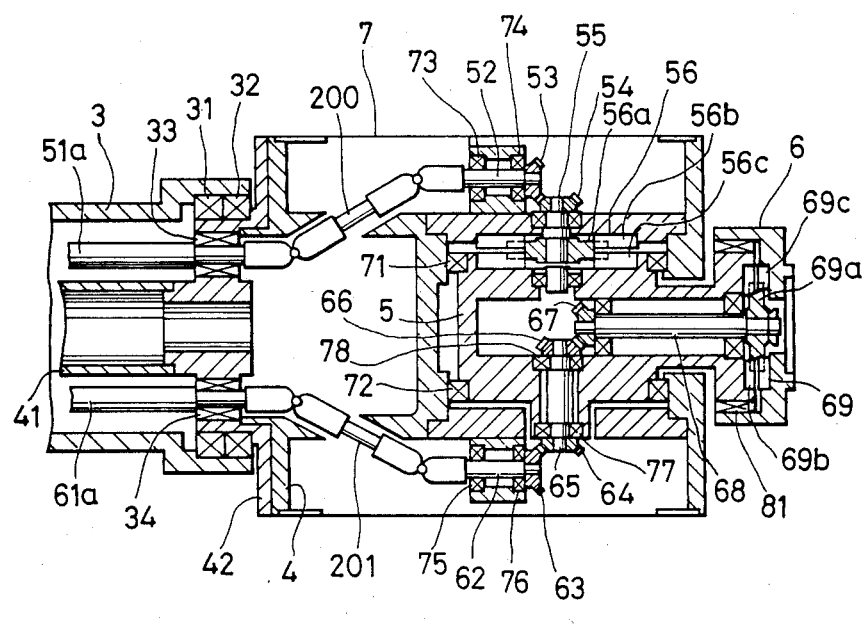
FIG. 1 is a side sectional view showing an embodiment of a wrist portion in a wrist device according to the present invention.
Figure 2:
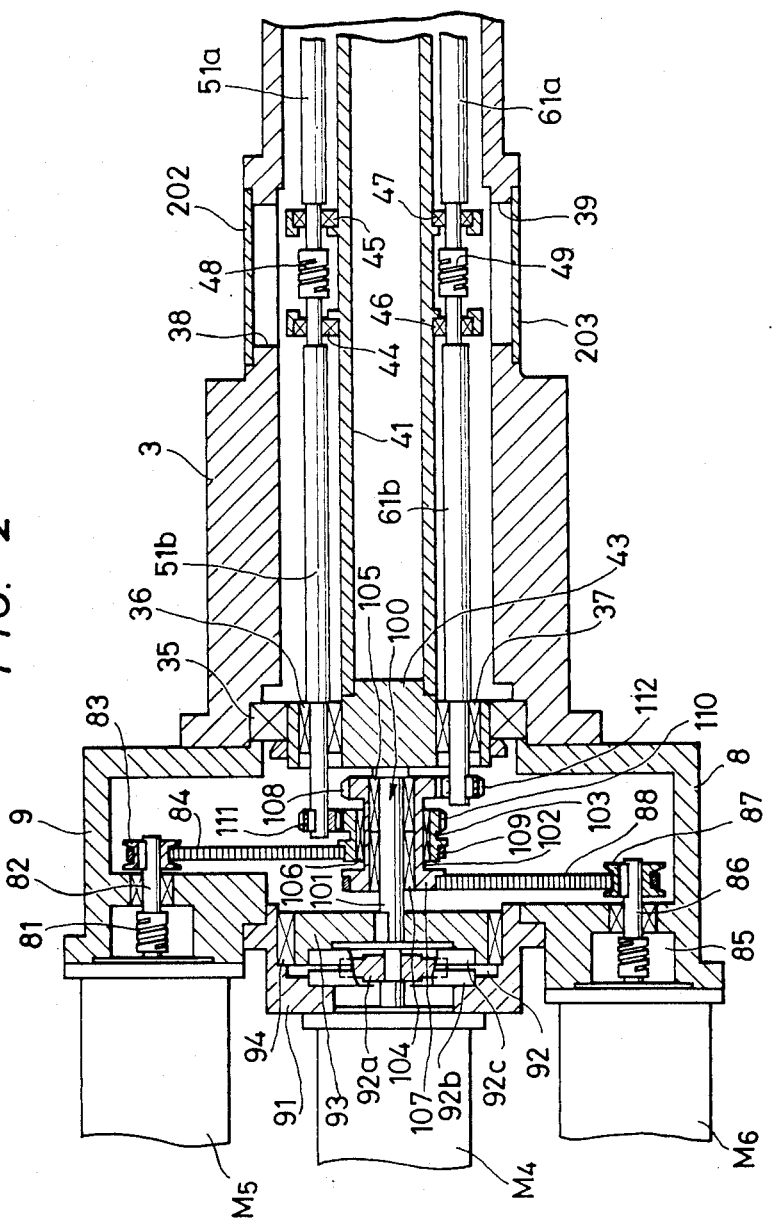
FIG. 2 is a side sectional view showing an embodiment of a wrist power portion in the wrist device of the present invention.

FIGS. 1 and 2 are schematic mechanism views which show an embodiment of the wrist device of an industrial robot according to the present invention. FIG. 1 shows only the wrist portion 7 and the front half part of the forearm 3 depicted in FIG. 3, for the sake of brevity, while FIG. 2 similarly shows only the wrist power portion 8 and the rear half part of the forearm 3 depicted in FIG. 3. First, the construction of the wrist portion 7 will be chiefly detailed with reference to FIG. 1. In FIG. 1, a hollow transmission shaft for rotation 41 is disposed inside the forearm 3, and a front flange 42 protruding from the front end of the forearm 3 is circumferentially provided at this end. The front flange 42 is journaled so as to be turnable relative to the forearm 3 through one set of rotary bearings 31 and 32, and the heel-of-hand casing 4 which is concave in shape is secured to this front flange 42. In addition, the front flange 42 supports a bending transmission shaft 51a and a twisting transmission shaft 61a through a respective rotary bearings 33 and 34, these transmission shafts extending into the heel-of-hand casing 4 from the interspace between the forearm 3 and the rotating transmission shaft 41. The rotating transmission shaft 41, the bending transmission shaft 51a and the twisting transmission shaft 61a are arranged in parallel with one another. Further, a universal joint 200 is snugly fitted on the end of the bending transmission shaft 51a leading into the heel-of-hand casing 4, and the end of the universal joint 200 remote from the shaft 51a is extended out of the outer wall of the heel-of-hand casing 4 and is snugly fitted on a bending driving shaft 52 supported by rotary bearings 73, 74. The bending driving shaft 52 is also arranged in parallel with the bending transmission shaft 51a. A bevel gear 53 is snugly fitted on the end of the bending driving shaft 52 remote from the joint 200. Meanwhile, within the concavity of the heel-of-hand casing 4, the palm casing 5 is supported so as to be rotatable through rotary bearings 71, 72. The axis of the rotation intersects orthogonally to that of the rotating transmission shaft 41, and a harmonic-drive speed reducer 56 is assembled between the rotating end part of the palm casing 5 and the heel-of-hand casing 4. The harmonic-drive speed reducer 56 includes an input wheel 56a which is snugly fitted on the shaft 55 of a bevel gear 54 lying on the rotation axis of the palm casing 5 and meshing with the aforementioned bevel gear 53, a fixed wheel 56b which is fixed to the heel-of-hand casing 4, and an output wheel 56c which is fixed to the palm casing 5. A device in which a high reduction ratio is achieved between the input wheel 56a and the output wheel 56c. Accordingly, the rotation of the shaft 55 is greatly decelerated and then transmitted to the palm casing 5. On the other hand, a universal joint 201, a twisting driving shaft 62 and a bevel gear 63 are similarly connected to the twisting transmission shaft 61a leading into the heel-of-hand casing 4, the twisting driving shaft 62 being supported by rotary bearings 75, 76 outside the outer wall of the heel-of-hand casing 4 on the side opposite to that of the joint 200. Further, a twisting intermediary shaft 65 which is diverted by a bevel gear 64 meshing with the bevel gear 63 and which leads into the palm casing 5 is supported by rotary bearings 77, 78. Still further, a bevel gear 66 is snugly fitted to the end of the twisting intermediary shaft 65. Meanwhile, in front of the palm casing 5, the finger casing 6 is supported so as to be rotatable through a rotary bearing 81. The axis of the rotation intersects orthogonally to the axis of rotation of the palm casing 5, and a second harmonic-drive speed reducer 69 is assembled between the plam casing 5 and the finger casing 6. This harmonic-drive speed reducer 69 includes an input wheel 69a which is snugly fitted on the shaft 68 of a bevel gear 67 lying on the rotation axis of the finger casing 6 and meshing with the aforementioned bevel gear 66, a fixed wheel 69b which is fixed to the palm casing 5, and an output wheel 69c which is fixed to the finger casing 6, and the rotation of the shaft 68 is greatly decelerated and then transmitted to the finger casing 6.

Next, the construction of the wrist power portion 8 attached to the rear end of the forearm 3 and the internal construction of the forearm 3 will be detailed with reference to FIG. 2. In FIG. 2, the motor holding frame 9 is mounted on the rear end of the forearm 3. This motor holding frame 9 has the driving motors $M_5$ and $M_6$ installed thereon directly, and has the driving motor $M_4$ installed thereon through an auxiliary frame 91. Further, a third harmonic-drive speed reducer 92 is assembled in the auxiliary frame 91. The harmonic-drive speed reducer 92 includes an input wheel 92a which is snugly fitted on the motor shaft of the driving motor $M_4$, a fixed wheel 92b which is fixed to the auxiliary frame 91, and an output wheel 92c which is fixed to a disc 93 that is supported by the auxiliary frame 91 so as to be rotatable through a rotary bearing 94. The revolutions of the driving motor $M_4$ are greatly decelerated and then transmitted to the disc 93. Meanwhile, inside the rear end of the forearm 3, a rear flange 43 is circumferentially provided at the end part of the hollow rotating transmission shaft 41 and is supported by the forearm 3 so as to be rotatable through a rotary bearing 35. In addition, the rear flange 43 supports a bending transmission shaft 51b and a twisting transmission shaft 61b through respective rotary bearings 36 and 37, these transmission shafts extending from the interspace of the forearm 3 and the rotating transmission shaft 41 into the motor holding frame 9 while penetrating this rear flange 43. The bending transmission shaft 51b and the twisting transmission shaft 61b are respectively arranged in parallel with the rotating transmission shaft 41. Further, substantially in the axially middle part of the interior of the forearm 3, these shafts 51b and 61b are respectively connected through shaft couplings 48 and 49 with the bending transmission shaft 51a and twisting transmission shaft 61a extending from the wrist portion 7. Still further, they are respectively supported on the outer periphery of the rotating transmission shaft 41 through rotary bearings 44, 45 and 46, 47 near the connected parts thereof. The forearm 3 is provided with two windows 38 and 39 for adjusting the connected parts, and covers 202 and 203 for covering the adjusting windows 38 and 39 are respectively mounted. Meanwhile, a coaxial driving mechanism 100 is disposed inside the motor holding frame 9 explained above. This coaxial driving mechanism 100 is chiefly constructed of a triple structure of shafts, the innermost shaft 101 of which has one end snugly fitted on the disc 93 and the other end secured to the rear flange 43. The axis of the innermost shaft 101 lies on the extension of the axis of the rotating transmission shaft 41. The intermediate shaft 102 of the coaxial driving mechanism 100 is journaled in rotary bearings 104, 105 around the innermost shaft 101, and it has a pulley 107 and a spur gear 108 snugly fitted on one end and the other end, respectively. The pulley 107 is connected to the motor shaft of the driving motor $M_6$ through a toothed belt 88, a pulley 87, a shaft 86 and a shaft coupling 85. As regards the spur gear 108 at the other end, a spur gear 112 meshing therewith is snugly fitted on the end of the twisting transmission shaft 61b. Further, the outermost shaft 103 of the coaxial driving mechanism 100 is journaled in a rotary bearing 106 around the intermediate shaft 102, and it similarly has a pulley 109 and a spur gear 110 snugly fitted on one end and the other end, respectively. The pulley 109 is connected to the motor shaft of the driving motor $M_5$ through a toothed belt 84, a pulley 83, a shaft 82 and a shaft coupling 81. As regards the spur gear 110 at the other end, a spur gear 111 meshing therewith is snugly fitted on the end of the bending transmission shaft 51b.

Next the operation of the embodiment shown in FIGS. 1 and 2 will be described. In FIG. 2, when the driving motor $M_4$ is rotated, the revolutions thereof are greatly decelerated by the harmonic-drive speed reducer 92, whereupon the disc 93 is rotated. The rotation of the disc 93 is transmitted to the innermost shaft 101 of the coaxial driving mechanism 100 and then to the rotating transmission shaft 41. Further, in FIG. 1, the rotation is transmitted to the heel-of-hand casing 4 secured to the front flange of the rotating transmission shaft 41, and the heel-of-hand casing 4 operates to turn in both the directions indicated by the arrow IV (FIG. 3) relative to the forearm 3. In addition, in FIG. 2, when the driving motor $M_5$ is rotated, the rotation is transmitted to the shaft 82 connected to the shaft of this motor by the shaft coupling 81, then to the outermost shaft 103 of the coaxial driving mechanism 100 through one set of pulleys 83, 109 and the toothed belt 84, then to the bending transmission shaft 51b through one set of spur gears 110, 111, and then to the bending transmission shaft 51a through the shaft coupling 48. Further, in FIG. 1, the rotation is transmitted to the bending driving shaft 52 through the universal joint 200 snugly fitted on the bending transmission shaft 51a, and it is diverted and transmitted to the shaft 55 through one set of bevel gears 53, 54. The rotation of this shaft 55 is greatly decelerated through the harmonic-drive speed reducer 56 and is transmitted to the palm casing 5, so that the palm casing 5 performs the oscillating turning operation indicated by the arrow V (FIG. 3) relative to the heel-of-hand casing 4. In general, the movement magnitude of the oscillating turning operation is set at about 200° around the axis of the rotary bearings 71, 72. In FIG. 2, when the driving motor $M_6$ is rotated, the rotation is transmitted to the shaft 88 connected with the shaft of this motor by the shaft coupling 85, then to the intermediate shaft 102 of the coaxial driving mechanism 100 through one set of pulleys 87, 107 and the toothed belt 88, then to the twisting transmission shaft 61b through one set of spur gears 108, 112, and then to the twisting transmission shaft 61a through the shaft coupling 49. Further, in FIG. 1, the rotation is transmitted to the twisting driving shaft 62 through the universal joint 201 snugly fitted on the twisting transmission shaft 61a, is diverted and transmitted to the twisting intermediary shaft 65 through one set of bevel gears 63, 64, and is diverted again and transmitted to the shaft 68 through the bevel gears 66, 67. The rotation of this shaft 68 is greatly decelerated through the harmonic-drive speed reducer 69 and then transmitted to the finger casing 6, so that the finger casing 6 operates to turn as indicated by the arrow VI (FIG. 3) relative to the palm casing 5.

According to the above embodiment, the harmonic-drive speed reducers 56 and 69 are respectively disposed at the final stages of the power transmission loops for performing the oscillating turning operation of the palm casing 5 and the turning operation of the finger casing 6. Therefore, backlashes in the mesh engagements of the bevel gears 53, 54, 63, 64, 66, 67 and the spur gears 110, 111, 108, 112 disposed until the harmonic-drive speed reducers 56 and 69 are reached are diminished by the speed reduction, and they become slight enough to be ignored in the operations of the palm casing 5 and the finger casing 6 which are the final output members, so that the positioning accuracy is improved. Moreover, the labor in assemblage required for eliminating the backlashes is sharply relieved. Besides, relative motions caused by the mesh engagements of the spur gears 110 and 111 and the spur gears 108 and 112 due to the turning operation of the heel-of-hand casing 4 in the directions of the arrow IV (FIG. 3) are respectively decelerated at great reduction ratios by the harmonic-drive speed reducers 56 and 69, while a relative motion caused by the mesh engagement of the bevel gears 66 and 67 due to the oscillating turning operation of the palm casing 5 in the directions of the arrow V (FIG. 3) is also decelerated by the harmonic-drive speed reducer 69. Therefore, the influences of the relative motions upon the operations of the output shafts can be suppressed to very small amounts. Accordingly, correcting operations which are intrinsically unnecessary and which the driving motors $M_5$ and $M_6$ execute on the basis of the calculations of a control device not shown are of very small amounts, and the lowerings of speeds ascribable to the correcting operations hardly take place. Moreover, the spur gears, bevel gears, shafts and bearings which are used for transmitting the power to the palm casing 5 and the finger casing 6 may be small in size because the transmission is carried out at high speed and with low torque, so that the wrist portion 7 and the forearm 3 can be made small in size and light in weight. Furthermore, owing to the fact that the coaxial driving mechanism 100 is arranged at the position protruding from the rear end of the forearm 3 and is of short axial dimension, and the fact that the three transmission shafts 41, 51 and 61 penetrating the interior of the forearm 3 are arranged in parallel, the respective power transmission loops for executing the oscillating turning operation of the palm casing 5 and the turning operation of the finger casing 6 can have their dimensions determined alone without being affected by the dimensions of the other power transmission loop. For this reason, the reduction of sizes and weights can be promoted more, and the efficient powered operations of the driving motors $M_5$ and $M_6$ are permitted. Owing to the bending transmission shaft 51 and the twisting transmission shaft 61 of high speed and low torque being arranged in parallel around the rotating transmission shaft 41 and carried by the front flange 42 and the rear flange 43 provided circumferentially at both the ends of the rotating transmission shaft 41, the machining accuracies of the individual transmission shafts and the assemblage and maintenance operations thereof can be established and performed more simply than in the prior-art system of the triple shaft structure. Because the high-speed transmission shafts 51 and 61 are divided at the nearly middle part of the forearm in the axial direction thereof, the divided parts are connected by the shaft couplings 48 and 49, and the shafts are supported on the outer periphery of the rotating transmission shaft 41 by the rotary bearings 44, 45 and 46, 47; the transmission shafts 51, 61 of small diameter which are deformed by their own weights can be journaled at a small span, and hence, the bending deformations can be suppressed to very small magnitudes. Accordingly, it is possible to avoid the problem of vibrations and the problem of the longevity of the bearings etc., which are posed in a case where the shafts with the bending deformations are rotated at high speed, and the need for prolonging the forearm 3 can be readily coped with. Furthermore, the high-speed transmission loops inside the forearm 3 and inside the wrist portion 7 can be arranged near the outer walls of the various members. Moreover, since the forearm 3 is provided with the adjusting windows 38 and 39 at the position where the transmission shafts 51a and 51b and the transmission shafts 61a and 61b are connected as stated above, the inspection and maintenance can be readily performed.

Figure 4:
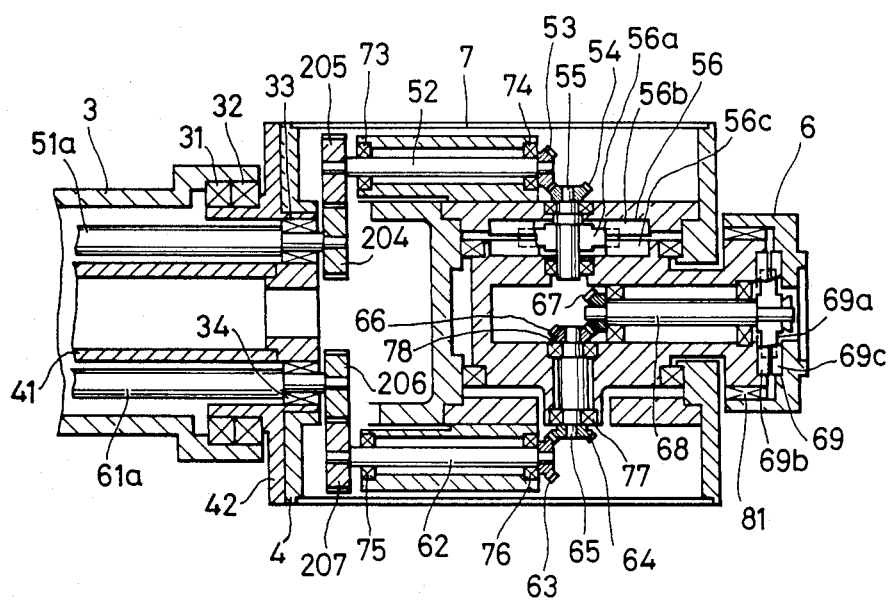
FIG. 4 is a side sectional view showing another embodiment of the wrist portion in the wrist device of the present invention.
Figure 5:
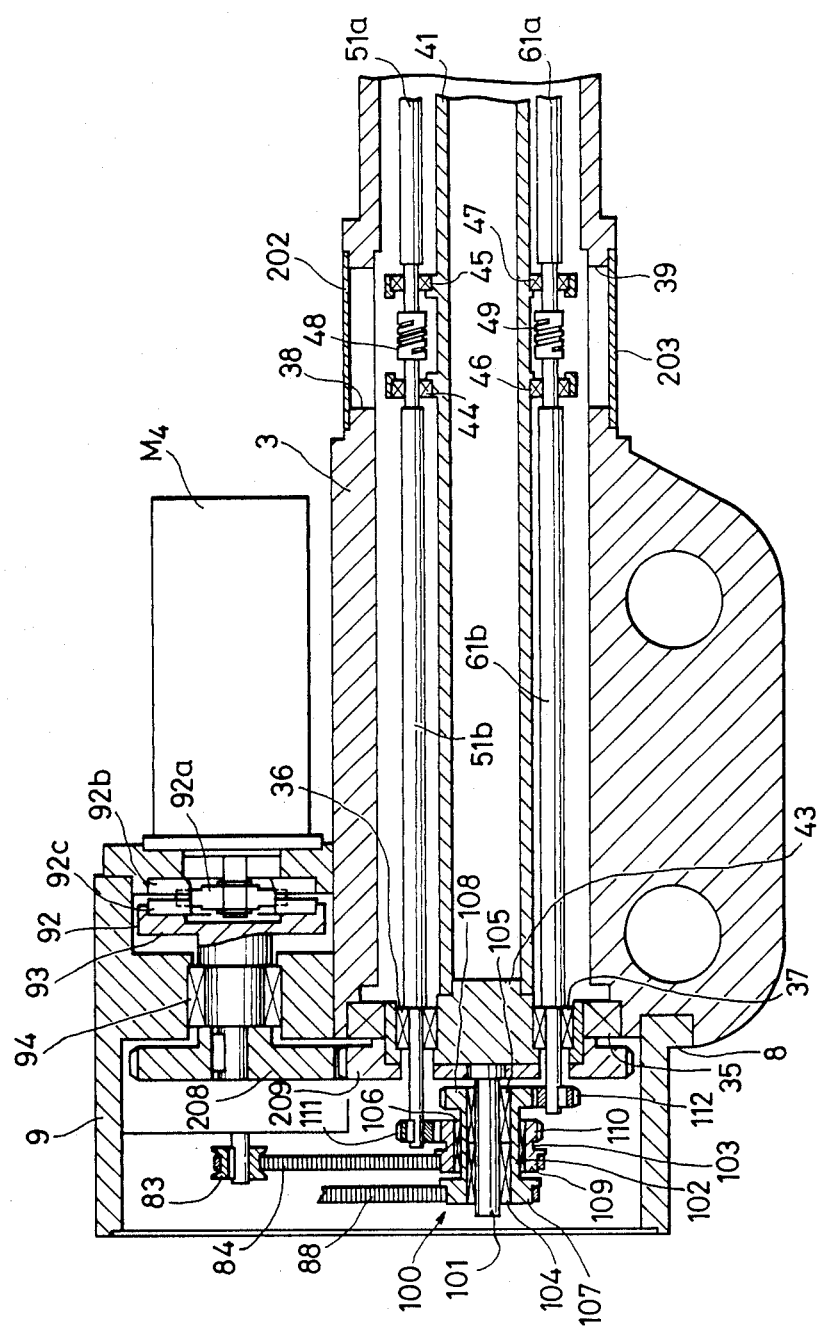
FIG. 5 is a vertical sectional view showing another embodiment of the wrist power portion in the wrist device of the present invention.

FIGS. 4 and 5 are schematic mechanism views which show another embodiment of the wrist device of an industrial robot according to the present invention. In these figures, the same symbols as in FIGS. 1 and 2 indicate identical components. For the sake of brevity, FIG. 4 illustrates only the wrist portion 7 and the front half part of the forearm 3 depicted in FIG. 3, while FIG. 5 similarly illustrates only the wrist power portion 8 and the rear half part of the forearm 3 depicted in FIG. 3. In the embodiment of FIG. 4, using two pairs of spur gears 204, 205 and 206, 207 instead of the universal joints 200 and 201 shown in FIG. 1, power is transmitted between the bending transmission shaft 51a and the bending driving shaft 52 arranged in parallel with each other and between the twisting transmission shaft 61a and the twisting driving shaft 62 similarly arranged. In the embodiment of FIG. 5, a spur gear 209 is snugly fitted on the rear flange 43, and a spur gear 208 meshing with this spur gear 209 is snugly fitted on a shaft end unitary with the disc 93. Meanwhile, one end of the innermost shaft 101 of the coaxial driving mechanism 100 is secured to the spur gear 208, and the other end is let open. The driving motor $M_4$, and the driving motors $M_5$ and $M_6$ not shown, are mounted on the motor holding frame 9 so that themotor shafts thereof may face rearwards of the the forearm 3 (leftwards in the figure). The remaining construction is the same as in the embodiment illustrated in FIG. 2.

The embodiment shown in FIGS. 4 and 5 is fundamentally the same as the embodiment shown in FIGS. 1 and 2, except that the revolutions of the driving motor $M_4$ are transmitted through the speed reducer 92, the disc 93 and one set of spur gears 208 and 209 without the intervention of the innermost shaft 101 of the coaxial driving mechanism 100, so as to drive the rotating transmission shaft 41 which is circumferentially provided with the rear flange 43. The embodiment of FIGS. 4 and 5 has the advantage that the toothed belts 84 and 88 can be replaced more easily.

As described above in detail, according to the present invention, owing to the fact that transmission shafts penetrating through an arm are arranged in parallel with one another as means for transmitting power to a wrist portion, that a plurality of flanges are circumferentially disposed along the outer periphery of the first transmission shaft being the main transmission shaft, and that the second transmission shaft and the third transmission shaft are divided and journaled in bearings between the flanges and are further connected and formed by shaft couplings, and the fact that driving motors are mounted on a motor holding frame protruded at the rear end of the arm, while a coaxial driving mechanism of short axial dimension is arranged in the motor holding frame, the diameters of the respective transmission shafts can be determined separately without being affected by other shaft diameters, and shaft inertias can be optimized. As a result, the power of the driving motors can be efficiently utilized. Moreover, since the transmission shafts are arranged in parallel with one another, the bearing supporting methods of the individual transmission shafts can be simplified. Accordingly, the machining, assemblage and maintenance of the shafts can be facilitated. In addition, since each of the transmission shafts rotating at high speed can be supported in the state in which it is divided into a plurality of short parts, bending vibrations attributed to the weights of the transmission shafts themselves can be suppressed to the utmost. As a result, it is also possible to lengthen the arm without enlarging the bore of this arm considerably.

We claimed:

1. In a wrist device of a robot which is attached to a front end of an arm as a base portion and which includes a wrist portion having three degrees of rotating freedom orthogonal to one another;

a wrist device of a robot characterized by comprising driving motors which are mounted on a rear end of said arm through a motor holding frame, a coaxial driving mechanism which is disposed in said motor holding frame and which transmits power of said driving motors between parallel shafts, and arm power transmission means constructed of a first transmission shaft being a main shaft and a second and third transmission shafts which are divided and journaled in bearings between a plurality of flanges circumferentially provided at an outer periphery of said first transmission shaft and which are connected and formed by shaft couplings, for transmitting power from said coaxial driving mechanism to said wrist portion, said wrist portion being provided with wrist power transmission means and speed reducers for realizing two frontward ones of said three degrees of rotating freedom.

2. A wrist device of a robot as defined in claim 1, wherein said first transmission shaft is a rotating transmission shaft.

3. A wrist device of a robot as defined in claim 1, wherein openings are provided in parts of said arm at which said second and third transmission shafts are divided and journaled in bearings.

4. A wrist device of a robot which is attached to a front end of an arm as a base portion and which includes a wrist portion having three degrees of rotating freedom orthogonal to one another, comprising driving motors which are mounted on a rear end of said arm through a motor holding frame, a coaxial driving mechanism which is disposed in said motor holding frame and which transmits power of said driving motor between non-coaxial parallel shafts, and arm power transmission means constructed of a first transmission shaft being a main shaft and second and third transmission shafts which are arranged exteriorily of said first transmission shaft, for transmitting power from said coaxial mechanism to said wrist portion being provided with universal joints which transmit power from said second and third transmission shafts through meshing gears to corresponding speed reducers in the immediate vicinity of the degrees of rotating freedom.

5. A wrist device of a robot which is attached to a front end of an arm as a base portion and which includes a wrist portion having three degrees of rotating freedom orthogonal to one another, comprising driving motors which are mounted on a rear end of said arm through a motor holding frame, a coaxial driving mechanism which is disposed in said motor holding frame and which transmits power of said driving motors for transmitting a power coaxially to a shaft of first degree of freedom, and arm power transmission means constructed of a first transmission shaft being a main shaft and second and third transmission shafts which are divided and journaled in bearings between a plurality of flanges circumferentially provided at an outer periphery of said first transmission shaft and which are connected and formed by shaft couplings, for transmitting power from said coaxial driving mechanism to said wrist portion being provided with wrist power transmission means and speed reducers with very high reduction ratio for realizing two frontward degrees of rotating freedom of said three degrees of rotating freedom.

* * * * *